(12) United States Patent
Polla et al.

(10) Patent No.: US 8,756,324 B2
(45) Date of Patent: Jun. 17, 2014

(54) AUTOMATIC CLOUD TEMPLATE APPROVAL

(75) Inventors: Srivathsan P. Polla, Karnataka (IN);
Sagi Vasavi, Karnataka (IN);
Rajashekar Dasari, Andhra Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 312 days.

(21) Appl. No.: 13/310,002

(22) Filed: Dec. 2, 2011

(65) Prior Publication Data
US 2013/0145033 A1 Jun. 6, 2013

(51) Int. Cl.
*G06F 15/173* (2006.01)

(52) U.S. Cl.
USPC ........................................ 709/226

(58) Field of Classification Search
CPC ............................ H04L 41/50; H04L 41/5054
USPC .................................... 709/223–229
See application file for complete search history.

(56) References Cited

U.S. PATENT DOCUMENTS

| | | | | |
|---|---|---|---|---|
| 7,305,431 B2 * | 12/2007 | Karnik et al. | | 709/203 |
| 7,634,737 B2 | 12/2009 | Beringer et al. | | |
| 7,743,127 B2 | 6/2010 | Santos et al. | | |
| 8,352,611 B2 * | 1/2013 | Maddhuri et al. | | 709/226 |
| 2002/0049573 A1 | 4/2002 | El Ata | | |
| 2003/0083936 A1 | 5/2003 | Mueller et al. | | |
| 2005/0216590 A1 * | 9/2005 | Aubin et al. | | 709/226 |
| 2010/0082309 A1 | 4/2010 | Dawson et al. | | |
| 2011/0138055 A1 | 6/2011 | Daly et al. | | |
| 2011/0178790 A1 * | 7/2011 | Golbourn et al. | | 703/22 |
| 2011/0320606 A1 * | 12/2011 | Madduri et al. | | 709/226 |
| 2012/0023501 A1 * | 1/2012 | Chi et al. | | 718/103 |
| 2012/0072597 A1 * | 3/2012 | Teather et al. | | 709/226 |
| 2012/0330711 A1 * | 12/2012 | Jain et al. | | 705/7.23 |
| 2012/0331113 A1 * | 12/2012 | Jain et al. | | 709/220 |
| 2013/0227137 A1 * | 8/2013 | Damola et al. | | 709/224 |

OTHER PUBLICATIONS

Unknown, "Platform Computing Dramatically Simplifies Private Cloud Management for Enabling Enterprise Platform-as-a-Service," Dec. 5, 2011, 2 pages.
Unknown, "Implementing the HP Cloud Map for VMware vCloud Director," Mar. 2011, 23 pages.

* cited by examiner

*Primary Examiner* — Brendan Higa

(57) ABSTRACT

Systems, methods, and computer-readable and executable instructions are provided for automatic cloud template approval. Automatic cloud template approval can include mapping a request to a chargeback package of a user, the request being for cloud service including a plurality of cloud service components. The automatic cloud template approval can include determining if the request is within the chargeback package of the user based on each of the plurality of cloud service components and, in response to the request being within the chargeback package of the user, automatically approving a cloud template to allocate the cloud service requested by the user. After approval resources will be allocated based on the availability, else resource analysis will be done and allocation will be done appropriately.

14 Claims, 4 Drawing Sheets

AUTOMATIC CLOUD TEMPLATE APPROVAL

BACKGROUND

With the increasing adaptation of private cloud systems to run workloads, various businesses seek to decrease cost by optimally using resources. A cloud system refers to computational resources that are linked through the use of computer networks. A private cloud system is the implementation of cloud services on resources that are dedicated to different departments of a business that has subscribed to the private cloud. With a private cloud, each department gets many benefits of self-service, scalability, and elasticity with the additional control and customization available from dedicated resources.

BRIEF DESCRIPTIONS OF THE DRAWINGS

DETAILED DESCRIPTION

Figure 1:
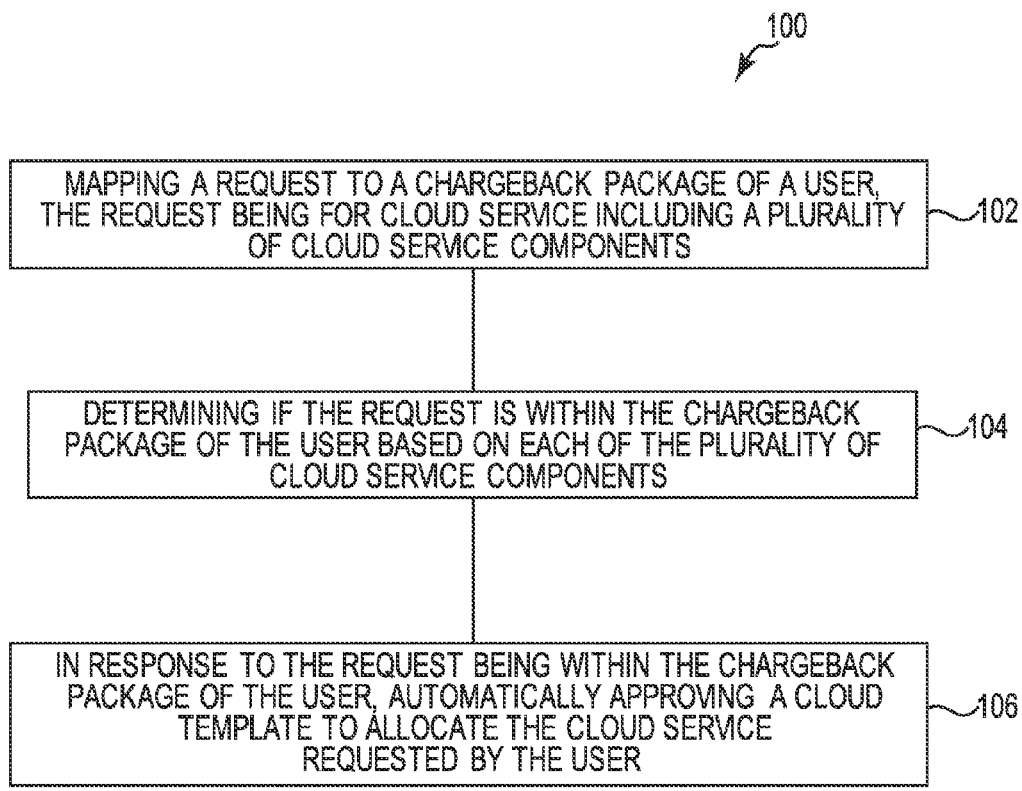
FIG. 1 is a flow chart illustrating an example of a method for automatic cloud template approval according to the present disclosure.

Examples of the present disclosure may include methods, systems, and computer-readable and executable instructions and/or logic. An example of a method for automatic cloud template approval may include mapping a request to a chargeback package of a user, the request being for cloud service including a plurality of cloud service components. An example of a method for automatic cloud template approval may include determining if the request is within the chargeback package of the user based on each of the plurality of cloud service components and, in response to the request being within the chargeback package of the user, automatically approving a cloud template to allocate the cloud service requested by the user.

A private cloud system is the implementation of cloud services on resources that are dedicated to different departments of an organization, or company, that has subscribed to the private cloud. Different departments may have different needs from the private cloud. Each department gets the benefits of self-service, scalability, and elasticity with the additional control and customization available from dedicated resources. Organizations can use infrastructure resources, such as servers, networks, and storage, as a service.

In order to manage a private cloud to provide infrastructure resources to departments or subscribers, a manager can determine all the needs of the departments and instruct an administrator to provision the resources to meet the needs of the entire organization. The resources provided should be based on the respective department's chargeback package. A chargeback package defines the resources accessible to a department in the private cloud. Administrators will sometimes rely only on the service request assigned to them for creating or providing the resources and do not consider the chargeback package details of the requesting department.

Currently, if an administrator is required to consider the chargeback package details of the requesting department, the administrator must manually create a template. A template contains the requested resources and maps the resources to the chargeback details of the department so that the requesting resources can be provisioned to the department. This requires that the administrator have knowledge of department's chargeback package details. Further, since the template is created manually by the administrator there is a significant possibility of allocating inappropriate resources to a department through inaccurate templates. For example, a high end server could be allocated to a low end chargeback package department. Without accurate templates, it is difficult to build efficient infrastructure in a private cloud as departments may not get the resources that are intended to be allocated to them.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and the process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. As will be appreciated, elements shown in the various examples herein can be added, exchanged, and/or eliminated so as to provide a number of additional examples of the present disclosure. In addition, as will be appreciated, the proportion and the relative scale of the elements provided in the figures are intended to illustrate the examples of the present disclosure, and should not be taken in a limiting sense. As used herein, the designator "N" particularly with respect to reference numerals in the drawings, indicates that a number of the particular feature so designated can be included with a number of examples of the present disclosure.

FIG. 1 is a flow chart illustrating an example of a method for automatic cloud template approval according to the present disclosure. The method 100 can provide automatic approval of a cloud template to allocate cloud resource requested by a user.

At 102, a request can be mapped to a chargeback package of a user, the request being for cloud service including a plurality of cloud service components. The plurality of cloud service components can include a plurality of cloud resources. Examples of the plurality of cloud service components can include server resources, SAN network resources, and storage resources, among others. The request can be from the user. A user can include a subscriber to the cloud service or a department of an organization wherein the organization uses a private cloud service, among many others. Examples of chargeback packages can include service level agreements and subscription packages of the cloud services, among others. Chargeback packages can define cloud resources accessible to a user.

In various examples of the present disclosure, the method 100 can include a plurality of chargeback packages comprising tiered levels of cloud service. The tiered levels can include classifications of the plurality of chargeback packages. For example, a chargeback package can include Class of Service (CoS) levels. Examples of CoS levels include, but are not limited to, Platinum, Gold, and Silver. A CoS can define the plurality of cloud resources that a user with the corresponding chargeback package has access to in the cloud service. For example, a platinum level chargeback package can be defined as 30 gigahertz (GHz) or more of processor resources, 30 gigabytes (GB) or more of memory, 20 redundant paths, 8 Gb I/O speed, and enterprise level storage. For example, the gold level chargeback package can be defined as 20 GHz-30 GHz of processor resources, 20 GB-30 GB of memory, 10 redundant paths, 4 Gb I/O speed, and midrange level storage. For example, the silver level chargeback package can be defined as 15 GHz-20 GHz of processor resources, 10 GB-20 GB of memory, 6 redundant paths, 2 Gb I/O speed, and entry level storage. Under the CoS levels, the resources accessible to a user can be based on charging a fixed price or can be allocated to a department based on the budget of a department, among many other things. The fixed price can be independent of the actual resources used. Table 1 shows a summary of the present example.

TABLE 1

Example Tiered Levels of Chargeback Packages.

| Package | Processor | Memory | Redundant Paths | I/O | Storage LUN |
|---|---|---|---|---|---|
| Platinum | 30 GHz+ | 30 GB+ | 20 | 8 Gb | Enterprise Level |
| Gold | 20 GHz-30 GHz | 20 GB-30 GB | 10 | 4 Gb | Midrange Level |
| Silver | 15 GHz-20 GHz | 10 GB-20 GB | 6 | 2 Gb | Entry Level |

A request for a plurality of cloud resources from a user can be mapped to the chargeback package of the user. A user can include a subscriber or a department of an organization. For example, a company with five departments may allocate resources in a cloud service between the five departments by classifying each departments as a CoS level of a chargeback package. Department 1 and 2 may have lower budgets and be assigned a silver level chargeback package. Department 3 and 4 may have higher budgets and be assigned a gold level chargeback package. Department 5 may have the highest budget and be assigned a platinum level chargeback package. This allows a company to allocate cloud resources among a plurality of departments. A lower budget department may require fewer resources than a higher budget department. The company can allocate more cloud resources to a department that has higher profits. Further, a private cloud service provider can allocate, in the same manner, among higher and lower paying subscribers based upon the chargeback package of the user. Table 2 shows a summary of the present example.

TABLE 2

Mapping a Request for a Plurality of Cloud Resources to a Chargeback Package.

| | | Subscriber Request | | | | | |
|---|---|---|---|---|---|---|---|
| | | Server | | SAN Network | | | |
| Service Request | Department | Processor | Memory | MPIO | I/O | Storage | Chargeback |
| #001 | Department 1 | 15 | 20 | 6 | 2 | Midrange Level Storage | Silver |
| #002 | Department 1 | 12 | 25 | 6 | 2 | Entry Level Storage | Silver |
| #003 | Department 2 | 20 | 30 | 6 | 2 | Entry Level Storage | Silver |
| #004 | Department 3 | 20 | 30 | 10 | 4 | Enterprise Level Storage | Gold |
| #005 | Department 3 | 25 | 25 | 10 | 4 | Midrange Level Storage | Gold |
| #006 | Department 4 | 20 | 32 | 20 | 4 | Midrange Level Storage | Gold |
| #007 | Department 5 | 35 | 32 | 20 | 8 | Enterprise Level Storage | Platinum |

At 104, the process can determine if the request is within the chargeback package of the user based on each of the plurality of cloud service components. For each of the plurality of cloud service components requested by the user, the process can determine if the request is within the same chargeback package as the chargeback package of the user. Being within the same chargeback package can include a resource amount equal to or less than the maximum resource amount allocated to the corresponding chargeback package, belonging to the corresponding chargeback package, and being within the range of the corresponding chargeback package, among many others. For example, Department 1 in service request #001 request 15 GHz of processor and 20 GB of memory from the server resource. Department 1, a silver level chargeback package user, is allowed up to 20 GHz of processor and 20 GB of memory from the server resource of the cloud service. Thus, the request for server resources in service request #001 is within the chargeback package of the user. The service request #002 by Department 1 request 12 GHz of processor and 25 GB of memory. The requested 25 GB of memory in request #002 is greater than the maximum value of 20 GB allowed for a silver level chargeback package. Thus, the request for server resource in service request #002 is not within the chargeback package of the use. This determination can be repeated for each of the plurality of cloud service components of the request for cloud service. Table 3 shows a summary of the present example including all the Server service requests in Table 2.

TABLE 3

Determining if the Server Request is within the Chargeback Package

| Service Request | Departments | Subscriber Server Request Processor | Subscriber Server Request Memory | Actual Chargeback | Request within Chargeback |
|---|---|---|---|---|---|
| #001 | 1 | 15 | 20 | Silver | Yes |
| #002 | 1 | 12 | 25 | Silver | No |
| #003 | 2 | 20 | 30 | Silver | Yes |
| #004 | 3 | 20 | 30 | Gold | Yes |
| #005 | 3 | 25 | 25 | Gold | Yes |
| #006 | 4 | 20 | 32 | Gold | No |
| #007 | 5 | 35 | 32 | Platinum | Yes |

The determination of the request being within the chargeback package of the user based on each of the plurality of cloud service component can be represented by a function. A function can be created by a module for each of the plurality of cloud service components requested based on the determination of the request being within the same chargeback package as the user. For example, a request for server resources, SAN Network resources, and storage resources can use a Server-Chargeback mapper module, a SAN Network-Chargeback mapper module, and a Storage-Chargeback mapper module, which can each create a function to compute if the resource request is within the chargeback package of the user. For example:

```
Server-Chargeback Mapper ( )
{
    If ( ( Server Processor_Chargeback == true) && (Server Memory_Chargeback == true ) )
    {
    Diff_Chargeback = NO
    }
    Else
    {
    Diff_Chargeback=YES
    }
}
SAN
```

At 106, in response to the request being within the chargeback package of the user for each of the plurality of cloud service components, a cloud template can be automatically approved to allocate the cloud service components requested by the user. Approval of the cloud template can qualify the request by the user for a template. The cloud template can be used to provision the requested cloud service of a plurality of cloud service components to the user, as discussed in the present disclosure.

In various examples of the present disclosure, in response to at least one of the plurality of cloud service components requested being outside the chargeback package of the user, a cloud template to the user can be denied. The denial of the cloud template can be automatic. Being outside the chargeback package of the user can include belonging to a different subscription package classification, being greater than the chargeback package classification, and being greater than the range of the chargeback package classification, among many others. The denial can include the reasons for denial and/or recommendations to the user to change the request or upgrade the chargeback package, among many others. Further, the denial can include a notification to the user. An example notification can include an email to the supervisor of a department in the company, among many others. Table 4 shows a summary of the present example.

TABLE 4

Template Approval

| Service Request | Template Qualifier | Recommendations |
|---|---|---|
| #001 | Yes | |
| #002 | No | Change in memory request |
| #003 | Yes | |
| #004 | No | Change in storage request |
| #005 | Yes | |
| #006 | No | Change in processor and redundancy request |
| #007 | Yes | |

A function can be created by a template qualifier module for a service request which is approved for a cloud template. For example:

```
Template Qualifier( )
{
    For Each (Sr_REQ_ID)
    {
        If (Storage_Diff_Chargeback==true) && (SAN Network_Diff_Chargeback==true)
            &&(Server_Diff_Charback==true))
        {
            Template_Qualifier = YES
        }
        Else
        {
            Template_ Qualifier = NO
        }
```

The template qualifier module can also create a function for a service request that was denied a cloud template. For example:

```
//Recommendations for Service Request which did not qualify
If(Template_Qualifier==No)
    {
        Rec_01( )
        {
            Email Supervisor( )
        }
        Rec_02( )
        {
            Upgrade_Depart_Pkg_Suggestion( )
        }
    }
} //End for Each
} //End main module
```

In various examples of the present disclosure, automatic approval of the cloud template can include accessing and modifying a cloud template. In response to the automatic approval of the cloud template, a cloud template can be accessed. The cloud template can include XML format, among many other formats. XML format can help ensure that all products and devices in the cloud template can understand the cloud template. The cloud template can be modified to include the plurality of cloud service components requested by the user. An example of modifying the cloud template can include adding the plurality of cloud resource requested by the user into the cloud template. For example:

```
<?xml version="1.0" encoding="UTF-8"?>
<XML_TEMPLATE_DESIGNER_METHOD="new">
    <XML_SERVICE_REQ_ID>
        <XML_ SERVICE_REQ_ID_TIER>
            <XML_ SERVICE_REQ_ID_TIER_SERVER>
                <XML_SERVICE_REQ_ID_TIER_SRV_PROCE="4" ARC="Quad"Units="GHz"/>
                <XML_SERVICE_REQ_ID_TIER_SRV_MEM="4" Units="MB" />
            </XML_ SERVICE_REQ_ID_TIER_SERVER>
            <XML_ SERVICE_REQ_ID_TIER_SAN_NETWORK>
                <XML_SERVICE_REQ_ID_TIER_ SAN_NETWORK_MPIO ="10"/>
                <XML_SERVICE_REQ_ID_TIER_ SAN_NETWORK_IOSpeed ="4" UNITS="GHz"/>
            </ XML_ SERVICE_REQ_ID_TIER_SAN_NETWORK>
            <XML_ SERVICE_REQ_ID_TIER_STORAGE>
                <XML_SERVICE_REQ_ID_TIER_STORAGE_LUN="100" UNITS="GB"/>
            </ XML_ SERVICE_REQ_ID_TIER_STORAGE>
        </XML_ SERVICE_REQ_ID_TIER>
    </<XML_SERVICE_REQ_ID>>
<XML_SERVICE_REQ_ID>
    <XML_ SERVICE_REQ_ID_TIER>
        <XML_ SERVICE_REQ_ID_TIER_SERVER>
            <XML_SERVICE_REQ_ID_TIER_SRV_PROCE="4" ARC="Quad"Units="GHz"/>
            <XML_SERVICE_REQ_ID_TIER_SRV_MEM="4" Units="MB" />
        </XML_ SERVICE_REQ_ID_TIER_SERVER>
        <XML_ SERVICE_REQ_ID_TIER_SAN_NETWORK>
            <XML_SERVICE_REQ_ID_TIER_SAN_NETWORK_MPIO ="10"/>
            <XML_SERVICE_REQ_ID_TIER_SAN_NETWORK_IOSpeed ="4" UNITS="GHz"/>
        </ XML_ SERVICE_REQ_ID_TIER_SAN_NETWORK>
        <XML_ SERVICE_REQ_ID_TIER_STORAGE>
            <XML_SERVICE_REQ_ID_TIER_STORAGE_LUN="100" UNITS="GB"/>
        </ XML_ SERVICE_REQ_ID_TIER_STORAGE>
    </XML_ SERVICE_REQ_ID_TIER>
</<XML_SERVICE_REQ_ID>>
</XML_TEMPLATE_DESIGNER_METHOD>
```

In various examples of the present disclosure, automatic approval of the cloud template can include analyzing the resources in the private cloud to determine if the requested service components are available. In response to a cloud template approval and modifying the template to include the service request, the plurality of cloud service components requested can be searched for in the cloud. In response to identifying available cloud service components for at least one of the plurality of cloud service components requested, the cloud template can be updated to include the number of cloud service components available and the location of the available cloud service components for the at least one cloud service component. In response to identifying that no cloud service components are available for at least one of the plurality of cloud service components requested, the cloud template can be updated to indicate that zero cloud service components are available for the at least one cloud service component. For example, a search for the plurality of cloud service components requested in a cloud template identified as TD_SD#001_1 could identify two available suitable servers with an IP Address of x.x.x.10 and x.x.x.13, two available suitable switches with an port identification of switch1:7 and switch2:0, and two available storage systems with identification of x.x.x.21 and x.x.x.23. For example, a search for the plurality of cloud service components requested in a cloud template identified as TD_SD#001_2 could identify one available suitable server with an IP Address of x.x.x.11, three available switches with a port identification of switchG:15, switchG:16, and switchG:17, and two available storage systems with identifications of x.x.x.24 and x.x.x.49. For example, a search for the plurality of cloud service components requested in a cloud template identified as TD_SD#001_3 could identify no available suitable servers, two available switches with an port identification of switchG:15 and switchG:16, and one available storage system with identification of x.x.x.24. Table 5 shows a summary of the present example.

TABLE 5

| | Resource Analysis | | |
|---|---|---|---|
| Template ID | Servers | Switch | Storage |
| TD_SD#001_1 | x.x.x.10, x.x.x.13 | Switch1:7, Switch2:0 | x.x.x.21, x.x.x.23 |
| TD_SD#001_2 | x.x.x.11 | SwitchG:15, SwitchG:16, SwitchG:17 | x.x.x.24, x.x.x.49 |
| TD_SD#001_3 | | SwitchG:15, SwitchG:16 | x.x.x.24 |

An example of an updated cloud template can include adding the number and location of the number of cloud service components for each of the plurality of service components requested. An example of an updated cloud template can include adding zero available cloud service components for each of the cloud service components that could not be located. For example, TD_SD#001_1 template could be modified to include:

```xml
<?xml version= "1.0" encoding= "UTF-8"?>
<XML_TEMPLATE_DESIGN_METHOD="new">
<XML_SERVICE_REQ_ID>
<XML_SERVICE_REQ_ID_TIER>
<XML_SERVICE_REQ_ID_TIER_SERVER>
<XML_SERVICE_REQ_ID_TIER_SRV_IP_ADDRESS="x.x.x.10", "x.x.x.13">
<XML_SERVICE_REG_ID_TIER_SRV_NO_SERVER="2">
< XML_SERVICE_REQ_ID_TIER_SRV_PROCE="15" ARC= "QUAD"Units="GHZ"/>
< XML_SERVICE_REQ_ID_TIER_SRV_MEM="20480"UNITs="MB"/>
< XML_SERVICE_REQ_ID_TIER_SERVER>
<XML_SERVICE_REQ_ID_TIER_SAN_NETWORK>
<XML_SERVICE_REQ_ID_TIER_ SAN_NETWORK _DET=" Switch1:7","Switch2:0">
<XML_SERVICE_REG_ID_TIER_ SAN_NETWORK_NO_="2">
< XML_SERVICE_REQ_ID_TIER_ SAN_NETWORK _MPIO="15"/>
< XML_SERVICE_REQ_ID_TIER_ SAN_NETWORK_IOSpeed= "4" UNITS ="GHZ"/>
< XML_SERVICE_REQ_ID_TIER_ SAN_NETWORK >
<XML_SERVICE_REQ_ID_TIER_STORAGE>
<XML_SERVICE_REQ_ID_TIER_NO_STORAGE="2">
<XML_SERVICE_REG_ID_TIER_DISC_DETAILS="x.x.x.21", "x.x.x.23">
< XML_SERVICE_REQ_ID_TIER_ STORAGE_LUN="100" UNITS= "GB"/>
< XML_SERVICE_REQ_ID_TIER_STORAGE>
<XML_SERVICE_REQ_ID_TIER>
<XML_SERVICE_REQ_ID>
```

In various examples of the present disclosure, automatic approval of the cloud template can include provisioning the plurality of cloud service components requested by the user in the modified cloud template to the user with a provisioning tool. In response to cloud service component being identified as available in the updated cloud temple, a provisioning tool can provision the available cloud service component. Provisioning the cloud service component can include allocating the cloud service component to the requesting user. The provisioned cloud service component and corresponding details can be updated into the cloud template. The details can include IP-Address and credentials of the provisioned cloud service component, among many others. In response to the updated cloud template indicating zero cloud service components identified as available, the provisioning tool can create the requested cloud service component and update the cloud template to include to the number of created cloud service components and the corresponding locations. The provisioning tool can provision the created cloud service component to the requesting user.

Figure 2:
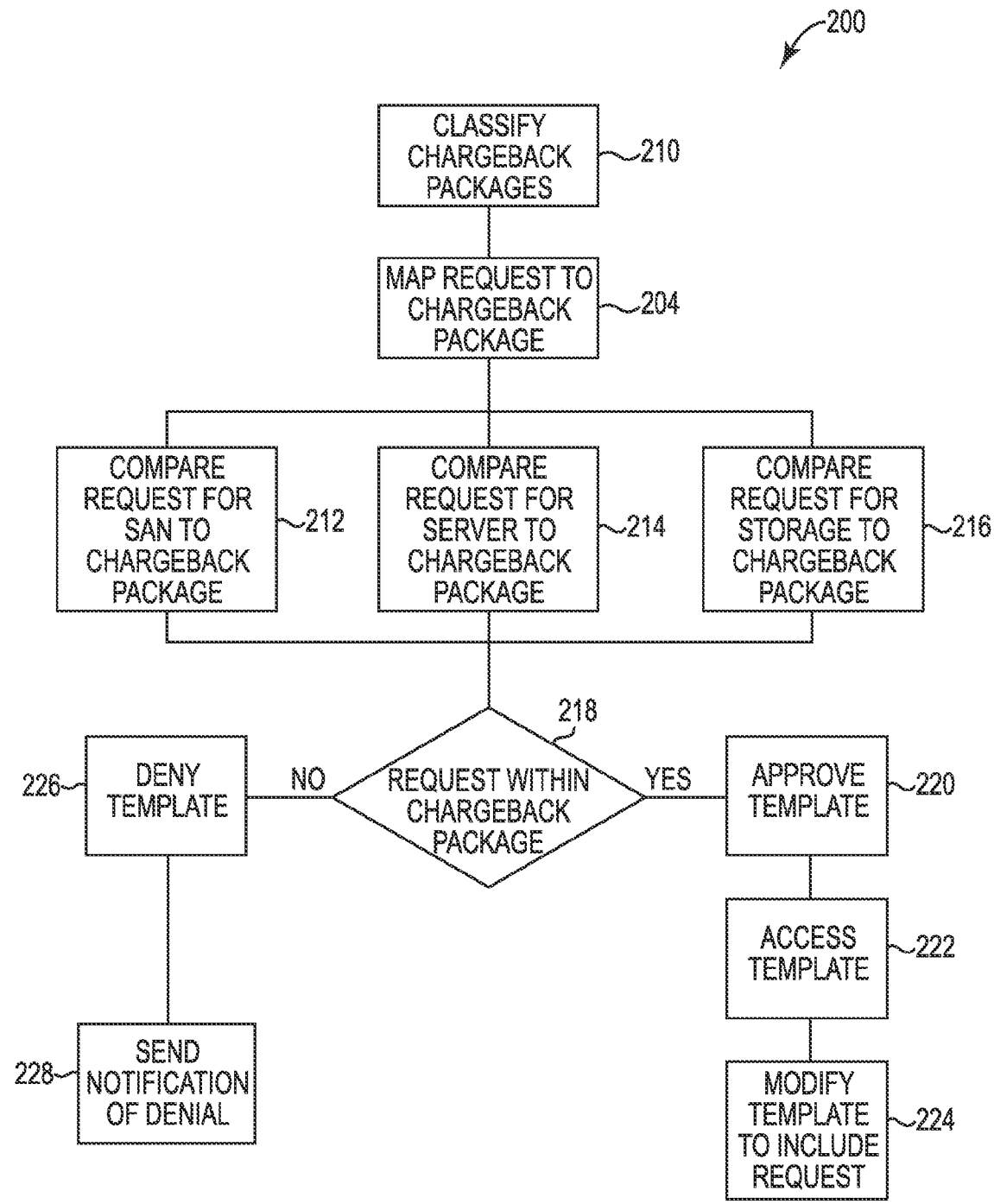
FIG. 2 is a flow chart illustrating an example of a process for automatic cloud template approval according to the present disclosure.

FIG. 2 is a flow chart illustrating an example of a process 200 for automatic cloud template approval according to the present disclosure. First, chargeback packages are classified, as shown at 210. Chargeback packages classifications can include subscription package classifications, among others. Classifying chargeback packages can include classifying a plurality of user chargeback packages into tiered levels of CoS, as described in the present disclosure. At 204, a request from a user for a plurality of cloud resources can be mapped to a chargeback classification of the requesting user. Then, at 212, the request for SAN resources by the user can be compared to the SAN resources allocated to the chargeback classification of the requesting user. At 214, the request for Server resources by the user can be compared to the server resources allocated to the chargeback classification of the requesting user. And, at 216, the request for Storage resources by the user can be compared to the Storage resources allocated to the chargeback classification of the requesting user. At 218, a determination can be made as to whether the request for SAN resource, Server resource, and Storage resource is within the chargeback classification of the requesting user.

In response to all requesting cloud resources, including SAN Network, Server, and Storage, being within the chargeback classification of the user, at 220, a cloud template to allocate the cloud resource requested can be automatically approved. Then, at 222, in response to the cloud template approval, a cloud template can be accessed. At 224, the cloud template can be modified to include the requested cloud resources.

In response to at least one of the requested cloud resources being outside the chargeback package classification of the user, at 226, a cloud template can be automatically denied. Then, at 228, a notification can be sent to the user of the denial.

Figure 3:
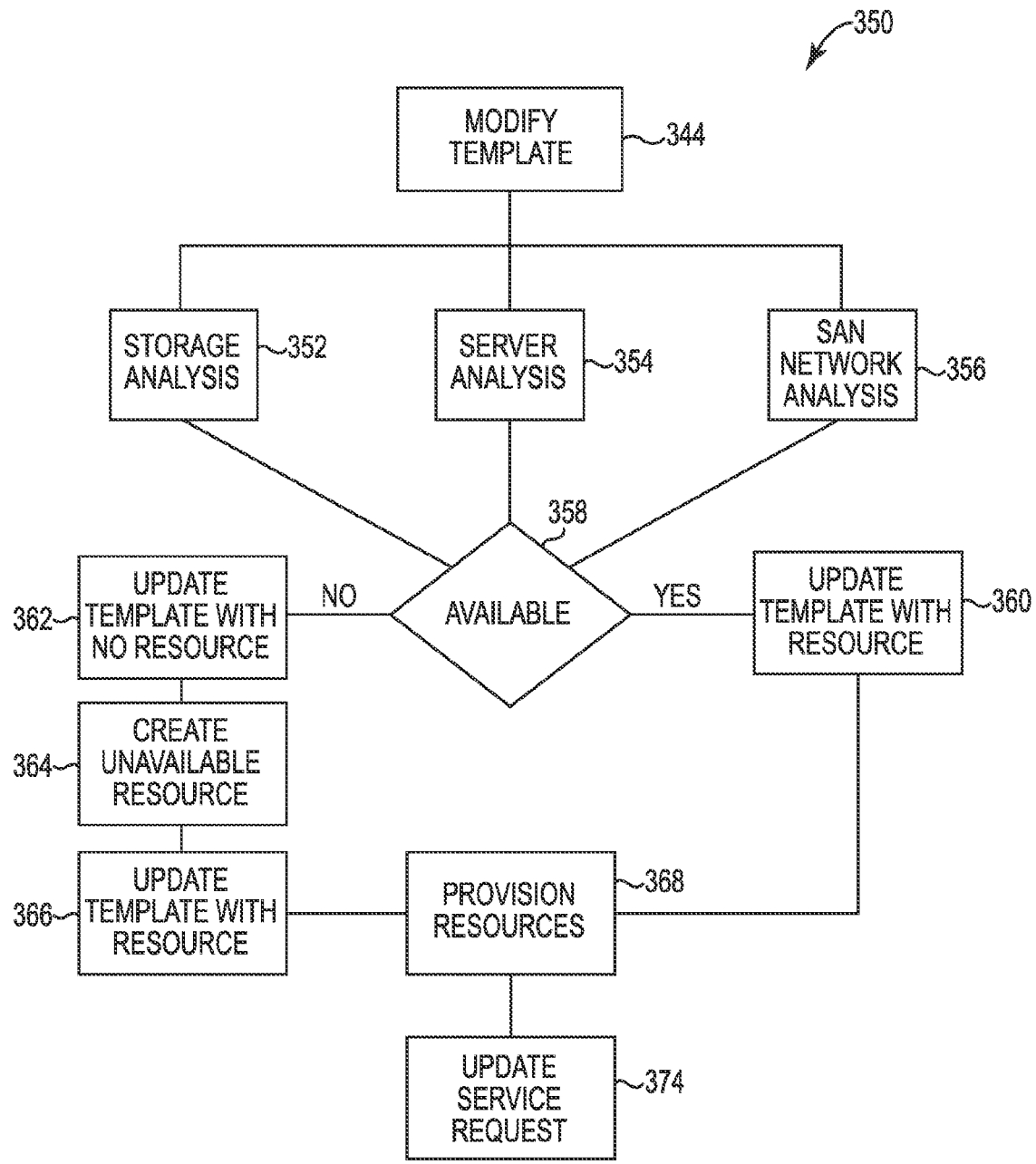
FIG. 3 is a flow chart illustrating an example of a process for provisioning resources within a cloud template according to the present disclosure.

FIG. 3 is a flow chart illustrating an example of a process 350 for provisioning resources within a cloud template according to the present disclosure. First, at 344, the cloud template that was approved can be modified to include the plurality of services requested. At 352, the request for storage resources by the user in the modified cloud template can be analyzed. The analysis of storage resources can include searching for available storage resource as requested in the modified cloud template. At 354, the request for server resources by the user in the modified cloud template can be analyzed. The analysis of server resources can include searching for available server resources as requested in the modified cloud template. And, at 356, the request for SAN Network resources by the user in the modified cloud template can be analyzed. The analysis of the SAN Network resources can include searching for available SAN Network resources as requested in the modifier cloud template. At 358, a determination can be made if there are available resources as requested in the modified cloud template based on the storage analysis, server analysis, and SAN Network analysis.

At 360, in response to at least one of the storage resources, server resource, or SAN Network resources being available, the cloud template can be updated with the number of resources available and the location of the resources. For example, if the server resources and storage resources are available but the SAN Network resources are not available, the server resources and storage resource will be updated in the template to include the number of resources and the location of the resources.

At 362, in response to at least one of the storage resources, server resources, or SAN Network resources identified as unavailable, the template can be updated to indicate that zero resources are available. At 364, the unavailable resources are created. And, at 366, the template can be updated with the number and location of the created resources. For example, if server resources and storage resources are available but the SAN Network resources are not available, the template will be updated to indicate that there are zero SAN Network resources and the requested SAN Network resources will be created. For example, the template may be updated to include the number of created SAN Network resources and the location of the created SAN Network resources.

At 368, the available and created resources in the updated template can be provisioned to the requesting user. Provisioning the resources may include allocating the resource to the requesting user, for example. Provisioning the SAN Network resources may include moving the SAN Network resources into the same zone and activating the zone. If a SAN Network resource is created, the resources may be created in the desired same zone. At, 374, the service request can be updated based on provisioned resource details for each provisioned resource, which may be added to the updated template.

Figure 4:
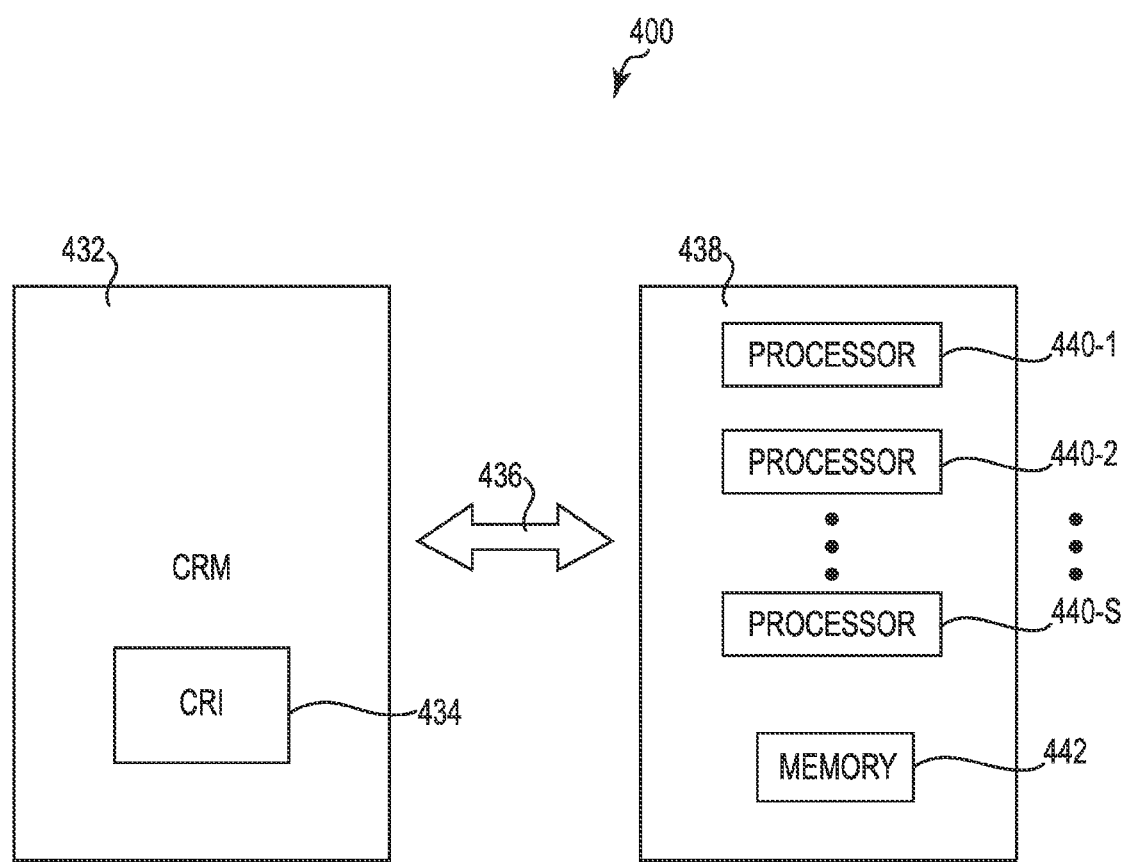
FIG. 4 illustrates a block diagram of an example of a computer-readable medium in communication with processing resources for automatic cloud template approval according to the present disclosure.

FIG. 4 illustrates a block diagram 430 of an example of a computer-readable medium (CRM) 432 in communication with processing resources 440-1, 440-2 . . . 440-N for automatic cloud template approval according to the present disclosure. CRM 432 can be in communication with computing resources 438 (e.g., a number of computing devices, such as servers having processor resources of more or fewer than 440-1, 440-2 . . . 440-N). The computing resources 426 can be in communication with, and/or receive a tangible non-transitory CRM 432 storing a set of computer readable instructions 434 executable by one or more of the processor resources 440-1, 440-2 . . . 440-N, as described herein. The computing resources 438 may include memory resources 442, and the processor resources 440-1, 440-2 . . . 440-N may be coupled to the memory resources 442.

Processor resources 440-1, 440-2 . . . 440-N can execute computer-readable instructions 434 that are stored on an internal or external non-transitory CRM 432. A non-transitory CRM (e.g., CRM 432), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), flash memory, etc., as well as other types of computer-readable media.

The non-transitory CRM 432 can be integral, or communicatively coupled, to a number of computing devices, in either in a wired or wireless manner. For example, the non-transitory computer-readable medium can be an internal memory, a portable memory, a portable disk, or a memory associated with another computing resource (e.g., enabling the computer-readable instructions to be transferred and/or executed across a network such as the Internet).

The CRM 432 can be in communication with the processor resources 440-1, 440-2 . . . 440-N via a communication path 436. The communication path 436 can be local or remote to a machine associated with the processor resources 440-1, 440-2 . . . 440-N. Examples of a local communication path 436 can include an electronic bus internal to a machine such as a computer where the CRM 432 is one of volatile, non-volatile, fixed, and/or removable storage medium in communication with the processor resources 440-1, 440-2 . . . 440-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 436 can be such that the CRM 436 is remote from the processor resources (e.g., 440-1, 440-2 . . . 440-N) such as in the example of a network connection between the CRM 432 and the processor resources (e.g., 440-1, 440-2 . . . 440-N). That is, the communication path 436 can be a network connection. Examples of such a network connection can include a local area network (LAN), a wide area network (WAN), a personal area network (PAN), and the Internet, among others. In such examples, the CRM 432 may be associated with a first computing device and the processor resources 440-1, 440-2 . . . 440-N may be associated with a second computing device (e.g., a server).

The processor resources 440-1, 440-2 . . . 440-N coupled to the memory resources 442 can map a request from a subscriber to a chargeback classification of the subscriber, the request being for a plurality of cloud resources. The processor resources 440-1, 440-2 . . . 440-N coupled to the memory resources 442 can compare the request to the chargeback classification of the subscriber to determine if the request for the plurality of cloud resources is within the range of cloud resources allocated to the chargeback package classification. A department-chargeback mapper module can be used to map the request to a chargeback classification of the subscriber and a plurality of resource-chargeback mapper modules can compare the request to the chargeback classification. The plurality of resource-chargeback mapper modules can include a server-chargeback mapper module, a SAN Network-chargeback mapper module, and a storage-chargeback mapper module, among others.

In response to the request being within the range of cloud resources allocated to the chargeback package classification based on each of the plurality of cloud resources, the processor resources 440-1, 440-2 . . . 440-N coupled to the memory resources 442 can automatically indicate approval for a cloud template, access a cloud template, and modify the cloud template to include the plurality of requested cloud resources. A template qualifier module can be used to automatically indicate approval for a cloud template and a template designer module can be used to access and modify the cloud template. In response to the request being greater than the range of resources allocated to the chargeback package based on each of the plurality of requested cloud resources, the processor resources 440-1, 440-2 . . . 440-N coupled to the memory resources 442 can automatically indicate denial for a cloud template and send a notification to the user of the denial. The template qualifier module can be used to automatically indicate denial and send a notification to the user.

In various examples of the present disclosure, in response to cloud template approval, the processor resources 440-1, 440-2 . . . 440-N coupled to the memory resources 442 can search for available cloud resources for each of the plurality of cloud resources requested. Searching for available cloud resources may determine if the plurality of cloud resources requested by the subscriber are available. In response to identifying available resources for at least one of the plurality of cloud resources requested, the processor resources 440-1, 440-2 . . . 440-N coupled to the memory resources 442 can update the cloud template with the number cloud resources available and the available cloud resources locations. A plurality of cloud resource-analysis modules can search and update the template with the available cloud resources. The plurality of cloud resource-analysis modules can include a server-analysis module, a SAN Network-analysis module, and a storage-analysis module, among others. In response to no identified available cloud resource for at least one of the plurality of cloud resources requested, the processor resources 440-1, 440-2 . . . 440-N coupled to the memory resources 442 can update the cloud template with an indication of zero cloud resources available for the at least one cloud resource requested. The plurality of cloud resource-analysis modules can update the template with the indication of zero cloud resources available for the at least one cloud resource requested.

In various examples of the present disclosure, the processor resources 440-1, 440-2 . . . 440-N coupled to the memory resources 442 can provision the cloud resources available in the updated cloud template with a provisioning tool. The processor resources 440-1, 440-2 . . . 440-N coupled to the memory resources 442 can create and provision the unavailable cloud resources in the updated cloud template with the provisioning tool.

The above specification, examples, and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method for automatic cloud template approval, comprising:
    mapping a request to a chargeback package of a user, the request being for cloud service including a plurality of cloud service components;
    determining if the request is within the chargeback package of the user based on each of the plurality of cloud service components; and
    in response to the request being within the chargeback package of the user;
        automatically approving a cloud template to allocate the cloud service requested by the user; and
        modifying the cloud template to include the plurality of cloud service components request by the user.

2. The method of claim 1, wherein the method further includes denying a cloud template in response to the request being outside the chargeback package of the user.

3. The method of claim 2, wherein the method further includes notifying a user of denial for a cloud template, wherein the notification includes the reason for the denial in an email to the user.

4. The method of claim 1, wherein approving a cloud template further includes:
    accessing a cloud template in XML format.

5. The method of claim 1, further including a plurality of chargeback packages comprising of tiered levels of cloud service, wherein the plurality of cloud service components include server resources, SAN network resources, and storage resources.

6. A non-transitory computer-readable medium storing a set of instructions executable by a processor to cause a computing device to:
    classify user subscription packages;
    map a request from a user for a plurality of cloud resources to a subscription package classification;
    determine if the request for the plurality of cloud resources belongs to the subscription package classification of the user based on each of the plurality of cloud resources;
    in response to the request belonging to the subscription package classification of the user;
        automatically approve access of a template to allocate the cloud resources requested by the user; and
        add the plurality of cloud resources requested by the user to the template in response to approval of access of the template; and
    in response to the request belonging to a different subscription package classification than the subscription package classification of the user, notify the user of denial for a template to allocate the cloud resources requested by the user.

7. The non-transitory computer-readable medium of claim 6, wherein the instructions executable to determine if the request for the plurality of cloud resources belongs to the subscription package classification of the user includes determining if the request is greater than the subscription package classification of the user.

8. The non-transitory computer-readable medium of claim 6, wherein the instructions executable to notify the user of denial for a template further includes a recommendation to change the subscription package and a recommendation to lower the request for the plurality of cloud resources.

9. The non-transitory computer-readable medium of claim 6, wherein the plurality of cloud resources include server resources, SAN network resources, and storage resources.

10. A system for automatic cloud template approval, comprising:
    a memory operable to store executable instructions; and
    a processor coupled to the memory, wherein the processor executes the instructions to:
        map a request from a subscriber to a chargeback package classification of the subscriber, the request being for a plurality of cloud resources;
        compare the request to the chargeback package classification of the subscriber to determine if the request is within the range of cloud resources allocated to the chargeback package classification;
        in response to the request being within the range of cloud resources allocated to the chargeback package classification based on each of the plurality of cloud resources:
            automatically indicate approval for a cloud template;
            access a cloud template; and
            modify the cloud template to include the plurality of requested cloud resources; and
        in response to the request being greater then the range of resources allocated to the chargeback package classification:
            automatically indicate denial for a cloud template; and
            send notification to the subscriber of denial.

11. The system of claim 10, wherein the processors further execute instructions to:
    search for available cloud resources for each of plurality of cloud resources requested in the modified cloud template;
    in response to identifying available cloud resources for at least one of the plurality of cloud resources requested, update the cloud template with the number of cloud resources available and the cloud resources corresponding location; and
    in response to no identified available cloud resource for at least one of the plurality of cloud resources requested, updated the cloud template with zero cloud resources available.

12. The system of claim 11, wherein the processors further execute instructions to:
provision the cloud resources available in the updated cloud template with a provisioning tool; and
create and provision the unavailable cloud resources in the updated cloud template with the provisioning tool.

13. The system of claim 10, wherein the modified cloud template comprises XML format containing the plurality of cloud resources requested.

14. The system of claim 10, wherein the processors further execute instructions to classify a plurality of subscriber chargeback packages, wherein the classification of the plurality of subscriber chargeback packages comprise tiered levels of allocation of the plurality of cloud resources including server resources, SAN network resources, and storage resources.

* * * * *

UNITED STATES PATENT AND TRADEMARK OFFICE
CERTIFICATE OF CORRECTION

PATENT NO.        : 8,756,324 B2                      Page 1 of 1
APPLICATION NO.   : 13/310002
DATED             : June 17, 2014
INVENTOR(S)       : Srivathsan P. Polla et al.

It is certified that error appears in the above-identified patent and that said Letters Patent is hereby corrected as shown below:

In the Claims

In column 14, line 48, in Claim 10, delete "then" and insert -- than --, therefor.

Signed and Sealed this
Seventeenth Day of February, 2015

Michelle K. Lee
*Deputy Director of the United States Patent and Trademark Office*